United States Patent
Strong et al.

(10) Patent No.: US 9,632,907 B2
(45) Date of Patent: Apr. 25, 2017

(54) TRACKING DEFERRED DATA PACKETS IN A DEBUG TRACE ARCHITECTURE

(71) Applicant: Intel Corporation, Santa Clara, CA (US)

(72) Inventors: Beeman C. Strong, Portland, OR (US);
Stephen J. Robinson, Austin, TX (US);
Jason W. Brandt, Austin, TX (US);
Peter Lachner, Heroldstatt (DE)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 14/566,374

(22) Filed: Dec. 10, 2014

(65) Prior Publication Data
US 2016/0170820 A1    Jun. 16, 2016

(51) Int. Cl.
G06F 11/00 (2006.01)
G06F 11/34 (2006.01)
G06F 11/36 (2006.01)
G06F 9/30 (2006.01)

(52) U.S. Cl.
CPC ............ *G06F 11/3466* (2013.01); *G06F 9/30* (2013.01); *G06F 11/3636* (2013.01)

(58) Field of Classification Search
CPC ............... G06F 11/079; G06F 11/0721; G06F 11/0751; G06F 11/3466; G06F 11/3476; G06F 11/3636
See application file for complete search history.

(56) References Cited

U.S. PATENT DOCUMENTS

| | | | | |
|---|---|---|---|---|
| 6,681,321 B1* | 1/2004 | Dale | ................... | G06F 11/3636 712/227 |
| 7,168,066 B1* | 1/2007 | Thekkath | ............ | G06F 11/3656 717/127 |
| 8,122,437 B2* | 2/2012 | Xu | ....................... | G06F 11/3636 714/35 |
| 2002/0147965 A1* | 10/2002 | Swaine | ................. | G06F 9/3802 7/124 |
| 2007/0089095 A1* | 4/2007 | Thekkath | .............. | G06F 9/3836 7/128 |
| 2007/0180333 A1* | 8/2007 | Thekkath | ............ | G06F 11/3636 714/45 |
| 2009/0037704 A1* | 2/2009 | Thekkath | ............ | G06F 11/3636 712/227 |

(Continued)

*Primary Examiner* — Marc Duncan
(74) *Attorney, Agent, or Firm* — Lowenstein Sandler LLP

(57) ABSTRACT

A processing device implementing tracking of deferred data packets in a debug trace architecture is disclosed. The processing device is to determine an order number corresponding to an order in which an instruction was executed relative to other executed instructions that correspond to an instruction type within a sequence of executed instructions, identify a first data packet corresponding to a first packet type and sequentially ordered, according to the order number, with respect to data packets of the first packet type within a data trace log, identify a second data packet corresponding to a second packet type and sequentially ordered, according to the order number, with respect to data packets of the second packet type within the data trace log, and map the identified first and second data packets to the instruction, wherein at least one of the first or second data packets was generated post-retirement of the instruction.

20 Claims, 16 Drawing Sheets

(56) References Cited

U.S. PATENT DOCUMENTS

2014/0281422 A1\* 9/2014 Abdallah .............. G06F 9/3834
    712/223
2015/0006868 A1\* 1/2015 Wagner ............... G06F 11/3466
    712/239

\* cited by examiner

| IP | Instruction | Data Packets |
|---|---|---|
| 0x1000 | Mov %r2, [0x4000] | DA(Load, 0x4000) |
| 0x1004 | Jz 0x1100 | DV(Load, 0x2000) |
| | | CB(0x1) |
| 0x1100 | Mov %r1, [0x5000] | DA(Load, 0x5000) |
| 0x1104 | Jz 0x1200 | DV(Load, 0x00f0) |
| 0x1200 | Inc %r1 | CB(0x1) |
| 0x1201 | Mov [0x5000], %r2 | DA(Store, 0x5000) |
| 0x1205 | Jmp %r2 | DV(Store, 0x00f1) |
| | | TakenBranchTarget(0x2000) |
| 0x2000 | Mov %r1, [0x6000] | DA(Load, 0x6000) |
| | | DV(Load, 0x00f1) |

TRACKING DEFERRED DATA PACKETS IN A DEBUG TRACE ARCHITECTURE

TECHNICAL FIELD

The embodiments of the disclosure relate generally to processing devices and, more specifically, relate to tracking deferred data packets in a debug trace architecture.

BACKGROUND

An instruction tracing system (ITS) of a processor provides debug features, including a control flow trace that can log instructions that are being executed by a processor. In order to make use of such trace information, a trace decoder is employed to decode the trace output, and to map the trace events to the code that was executing on the processor. In order to simplify this process, trace packets are typically emitted in program order, so that a packet generated by a particular instruction follows any packets generated by older instructions, and precedes any generated by younger instructions. On modern, out-of-order (OoO) microarchitectures, a straight-forward method of producing packets in programmatic order is to generate the packets at retirement time. Though instructions often execute out-of-order, they still retire in-order, and hence packet generation at retirement time ensures that packets are emitted in-order. In some OoO microarchitectures, however, data accesses, such as loads and stores, may not complete or even begin until after retirement time. This complicates trace packet ordering for trace capabilities that attempt to expose information about data accesses, such as the address or data value.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2A illustrates an exemplary instruction sequence and associated data packets generated in-order.

DETAILED DESCRIPTION

Figure 1:
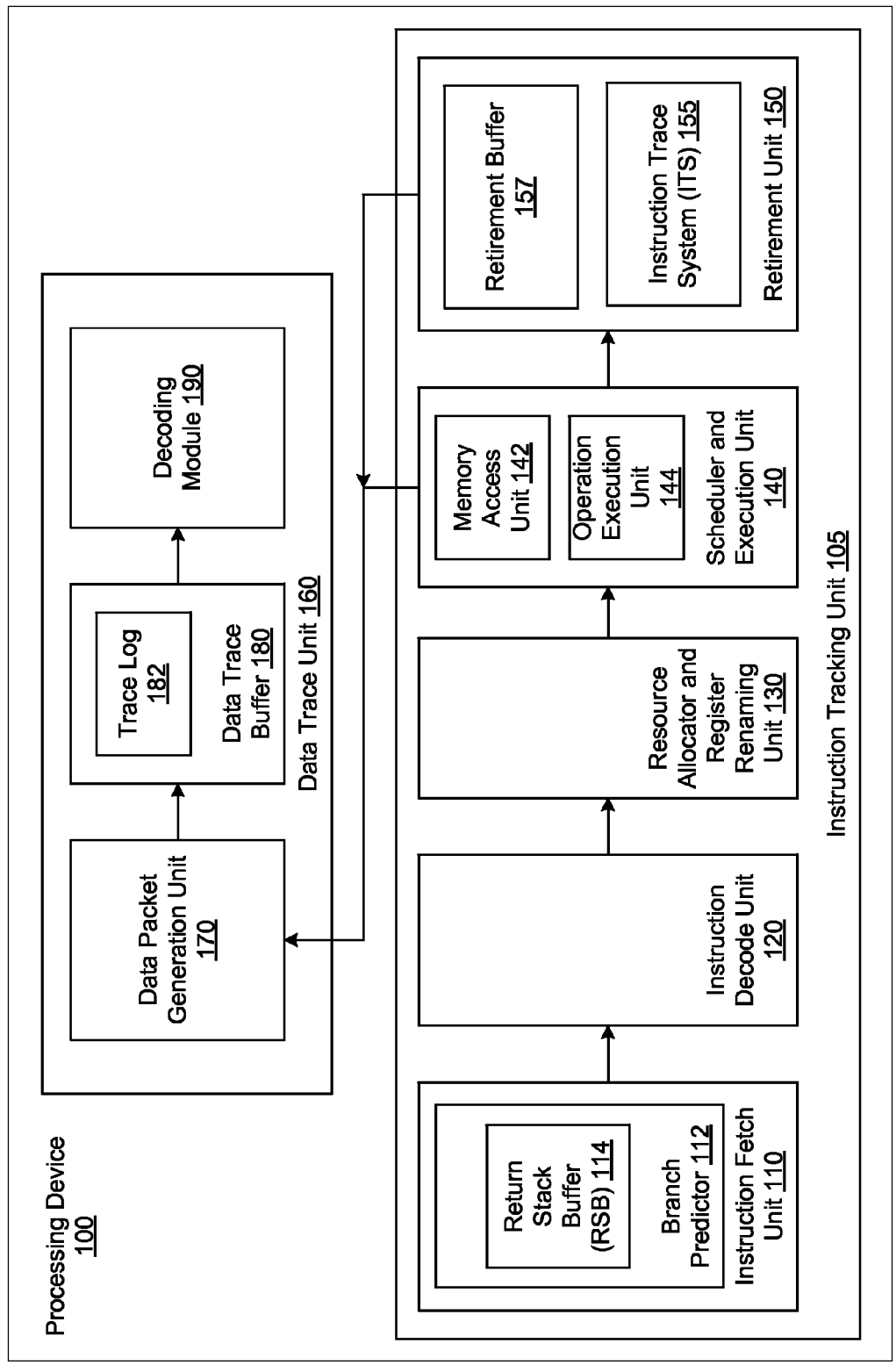
FIG. 1 illustrates an exemplary architecture in accordance with which embodiments may operate including a debug trace architecture that allows for tracking of deferred data packets.

Embodiments of the disclosure implement techniques to trace deferred data packets in a debug trace architecture. In particular, data packets that are generated in an out-of-order manner ("deferred data packets") can be mapped to the instruction from which the data packets were generated. For example, a memory read instruction may generate a data address (DA) packet and a data value (DV) packet, with one or more of the packets being generated post-retirement of the instruction. In the embodiments described herein, some or all data packets can be deferred, and hence inserted post-retirement time, even within trace architectures where other packet generation is performed at retire time. This implies that data packets are not necessarily ordered within the trace with respect to retirement-generated packets. However, the proper ordering can be restored by a trace decoder provided that the trace decoder has sufficient information to re-order the packets.

For microarchitectures where data memory accesses can complete post-retirement, at-retirement packet generation approaches add a complication when tracing data accesses. For example, in a microarchitecture where either all memory accesses complete by retire time, or only store operations (but not load operations) can complete post-retirement, the data address should be known at retire time. This is because any accesses or computations that feed into the address must have resolved. However, if either the address is not easily accessible by the trace logic at retirement time, or if loads can execute post-retirement and hence the address may not yet be resolved, it is possible that any data address packets will not be able to be generated at retirement time.

As another example, for a microarchitecture where load operations complete post-retirement, the data value for such load operations is unavailable at retire time. For a microarchitecture where only store operations complete post-retirement, but loads do not, the store value should be available at retire time. As described above, however, it is possible that the store data value is not reasonably accessible by the trace logic at retirement time. In such cases, data value packets may be difficult to generate at retirement time.

The embodiments described herein for the trace architecture to allow data address and/or value packets to be generated post-retirement offer reduced complexity and the potential for reduced bandwidth. This avoids limitations on or changes to the microarchitecture by emitting data access packets when the payload information (address and/or value) is readily available. The embodiments of the disclosure allow for the proper re-ordering of such deferred data packets. Regardless of where they are located in the trace output, the trace decoder is able to map them to the respective instructions or operations that caused the memory access(es). If the data packets are not generated in a way that makes decoding feasible, then additional information in the trace may be utilized in order for the decoder to order and map the data packets properly. The spectrum of options for supporting deferred data packets, summarized herein, depends upon the knowledge of the trace decoder, and on the information available at retirement time. It is noted that the embodiments described herein are applicable to not only out-of-order microarchitectures, but also to in-order microarchitectures that opt to use deferred data trace schemes (e.g., a schemes that executes store instructions post-retirement).

In addition to the above benefits, another benefit is the avoidance of added trace logic complexity, and of microarchitectural limitations for the implementation of memory accesses (i.e., forcing them to complete by retire time). An architecture that allows data access packets to be deferred can enable reduced bandwidth, by adding flexibility to when these deferred packets are emitted. For instance, some trace architectures collect packet output from multiple instructions into a single packet. Conditional branch results are a common example, where a single packet may hold the taken versus not-taken result for one or many conditional branches (conditional branch packets, or "CB packets"). In a trace architecture where all packets must be generated at retire time, the CB packets will not be able to accumulate as many results per CB, since each load or store will "interrupt" the accumulation with a DA and DV packet. When the DA and DV packets can be deferred, the hardware can choose to defer them until the CB is "full", thereby improving efficiency by reducing instances of partially filled CB packets.

Other previous methods of tracking deferred data packets required that data addresses and data values are exposed in order with respect to all other packets. However, this limits microarchitectural options for implementing data accesses (i.e., loads or stores executed post-retirement), or requires expensive and complex additional hardware to ensure that the packets from these accesses are generated in-order. For example, packets from all operations could be generated long after retirement, to accommodate those data accesses that execute post-retirement. However, that would require deeper buffers and added logic (more area and hence power) to keep the trace information available post-retirement.

Another alternative would be to allow data access packets to be generated out-of-order, but include with those packets an indication of which instruction generated them (i.e., the instruction pointer, or IP), so that the decoder could interpret the proper ordering. While this partially reduces the complexity, it comes at great bandwidth cost, requiring the IP (typically 4-8 bytes) to be provided for each data access packet. This added bandwidth would likely cause increased decode time, reduced effective output buffer size, and increased likelihood of internal trace buffer overflows (and hence dropped packets).

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, SoC devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Additionally, although the following embodiments are described with reference to a processor, other embodiments are applicable to other types of integrated circuits and logic devices. Similar techniques and teachings of embodiments of the disclosure can be applied to other types of circuits or semiconductor devices that can benefit from higher pipeline throughput and improved performance. The teachings of embodiments of the disclosure are applicable to any processor or machine that performs data manipulations. However, the present disclosure is not limited to processors or machines that perform 512 bit, 256 bit, 128 bit, 64 bit, 32 bit, or 16 bit data operations, but can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, external input and output (I/O), and debug trace architecture.

In one embodiment, the ISA may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file). In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

FIG. 1 illustrates an exemplary architecture 100 in accordance with which embodiments may operate, where the architecture 100 is a debug architecture that allows for tracking of deferred data packets and mapping of the deferred data packets back to the instructions from which they originated. Architecture 100 may include processor components such as, but not limited to, an instruction tracking unit 105 and a data trace unit 160 communicably coupled to the instruction tracking unit 105. The instruction tracking unit 105 may include components such as, but not limited to, an instruction fetch unit 110, an instruction decode unit 120, a resource allocator and register renaming unit 130, scheduler and execution units 140, and a retirement unit 150. The data trace unit 160 may include components such as, but not limited to, a data packet generation unit 170, a data trace buffer 180, and a decoding module 190. In some embodiments, the components of the architecture 100 may be implemented in hardware, software, or a combination thereof. For example, in some embodiments, the decoding module 190 may be implemented as software or as a hardware block. It is noted that the disclosed embodiments are not limited to data packets, but are applicable to packets in general. Moreover, the packets need not be generated by instructions.

Instruction fetch unit 110 may fetch instructions from memory and feed them to instruction decode unit 120, which, in turn, decodes or interprets them. For example, in one embodiment, the instruction decode unit 120 decodes a received instruction into one or more operations called "micro-instructions" or "micro-operations" (also called micro op or uops) that the processor can execute. In other embodiments, the instruction decode unit 120 parses the instruction into an opcode and corresponding data and control fields that are used by the architecture 100 to perform operations in accordance with one embodiment.

In one embodiment, the resource allocator and register renaming unit 130 is where the uops from instruction decode unit 120 are prepared for execution. Resource allocator logic of unit 130 allocates machine buffers and resources that each uop uses to execute. Register renaming logic of unit 130 renames logic registers onto entries in a register file. The resource allocator may also allocate an entry for each uop in one of two uop queues, one for memory operations and one for non-memory operations.

The scheduler and execution unit 140 includes logic to schedule and execute renamed uops. For instance, uop schedulers may determine when a uop is ready to execute based on the readiness of their dependent input register operand sources and the availability of the execution resources the uops need to complete their operation. The schedulers arbitrate for the dispatch ports to schedule uops for execution. Furthermore, execution cluster(s) may include a set of one or more operation execution units 144 and a set of one or more memory access units 142. The operation execution units 144 may perform various operations (e.g., shifts, addition, subtraction, multiplication) and operate on various types of data (e.g., scalar floating point, packed integer, packed floating point, vector integer, vector floating point).

The retirement unit 150 can receive completed uops from the scheduler and execution unit 140 for retirement. In one embodiment, the retirement unit 150 includes a real time instruction trace unit (ITS), which outputs a trace stream that details what instructions were executed by the scheduler and execution unit 140. In some embodiments, a retirement buffer 157 of the retirement unit 150 may temporarily store retired instructions. The retirement buffer 157 may be communicably interfaced to ITS 155 and to the data packet generation unit 170 of the data trace unit 160.

In some embodiments, the data trace unit 160, and specifically data packet generation unit 170, is communicably coupled to one or more of the scheduler and execution unit 140 or the retirement unit 150. The data packet generation unit 170 may initiate the tracing of instructions by generating data packets for instructions at retirement of the instruction, or post-retirement (e.g., when a memory access occurs). Generated data packets may be stored in a trace log 182 of the data trace buffer 180.

In some embodiments, the decoding module 190 is an ISA-aware decoder that is capable of utilizing source binaries to obtain information about the instructions that were executed or are being executed, thus allowing the decoding module 190 to identify load and store instructions/operations. If the decoding module 190 is able to resolve the instructions that can trigger a load or store, then the decoding module 190 can use this information to re-order the deferred data packets. Once a load or store instruction is detected, the decoder can determine that a DA packet (a data packet containing a data address of a memory access) and a DV packet (a data packet containing an accessed data value corresponding to the data address) are forthcoming. Even if these data packets come later in the trace, after packets from younger instructions are generated, the decoding module 190 can map them retroactively to the instruction from which they were generated.

In some embodiments, the data packet generation unit 170 may generate a marker packet indicating that a load or store instruction has retired, which the decoding module 190 can utilize if the decoding module 190 is unable to determine which instructions generate load or store memory accesses from static disassembly. In some embodiments, if the decoder is unable to make such determinations, the marker packet may include the IP of the instruction. While such embodiments may reduce ordering constraints, they may also result in higher bandwidth consumption.

In some embodiments, for microarchitectures in which the data address is known and available at retirement time, a DA packet can be generated and inserted into the trace log 182 at that time and serve as the marker packet. The decoding module 190 can then determine that an associated DV packet will be forthcoming, which will be associated with the DA, and hence the instruction that generated it. Similarly, if the DV packet is available at retire time, but not the DA packet, the DV packet can serve as the marker packet.

In some embodiments, including an indication of an instruction type in a data packet (e.g., "load" or "store") may offer similar benefits at the cost of only a single bit per packet. For example, consider an embodiment where the decoding module 190 can discern memory accessing instructions from binary disassembly, and both DA packets and DV packets are deferred. If the decoding module 190 can also infer the type of access ("load" or "store"), and the DA and DV packets indicate the access type, then the decoding module 190 can determine that when a load is detected, that the next unmapped DA packet applies to this load, and the next unmapped load DV packet also applies to this load. Thus, in such embodiments, the load DA packets are ordered with respect to other load DA packets (same instruction type, same data packet type), and the same is true for each store DA packet, load DV packet, and store DV packet. This functionality reduces the interdependency between load and store packet generation times, and between address and data packet generation times, thereby conferring more microarchitectural flexibility.

In some embodiments, one or more sync packets may be included within a data trace. For example, a sync packet may include any relevant processor state (such as the IP) to be utilized by the decoding module 190 in order to begin to decode. In such embodiments, no packets from instructions that are programmatically older than the sync packet are generated after the sync packet, otherwise the decoding module 190 (which begins decoding at the sync point) may be confused by deferred packets generated by older instructions that the decoding module 190 has not previously detected/identified. In such embodiments, a fencing operation may be utilized prior to inserting sync packets into the data trace to force all older memory accesses to complete, and hence to generate the associated DA packets and DV packets before any sync packets are detected/identified by the decoding module 190.

While the aforementioned embodiments were described for architectures in which exactly one DA packet and one DV packet are generated per instruction, the embodiments described herein are also applicable to other architectures in which a single instruction/operation may execute multiple memory accesses, with a data trace unit generating more than two data packets. Embodiments of such architectures may utilize decoding modules that are aware of which instructions/instruction types execute multiple memory accesses. Such embodiments may utilize data trace units with higher buffering capacity while still allowing for the mapping of deferred data packets, thus allowing for the complexity of an architecture to scale up in a straightforward manner.

In some embodiments, the trace decoder can determine which instructions generated which data packets by (1) inserting a packet into the trace stream at data access retirement time (which could be a simple "data access retired" indicator, or could be any portion of the data address and/or value that is available at retirement time), or (2) by imbuing the trace decoder with sufficient knowledge of the instruction set architecture (ISA) to be able to infer load and stores from the source disassembly. When the trace decoder later sees the deferred data packets, as long as they are provided in order or with sufficient information such that the order can be determined by the trace decoder (e.g., in order with respect to other data packets of similar instruction type and data packet type), the trace decoder can apply the data access packet information to the appropriate instructions retroactively. Accordingly, trace fidelity is retained and the processed trace output will be identical to that which would have been produced had the data access packets been generated at retirement time.

FIG. 2A illustrates an exemplary instruction sequence 200 and associated data packets generated in-order. As shown in instruction sequence 200, the destination operand follows the operation for a particular instruction. In the data packet output, packets are listed in the form PacketType(Payload). The arrows indicate causality (i.e., which instruction generated which packet(s)). All data packets of FIG. 2A are generated at retire time of their respective instructions, and hence are emitted in precise program order.

Figure 2B:
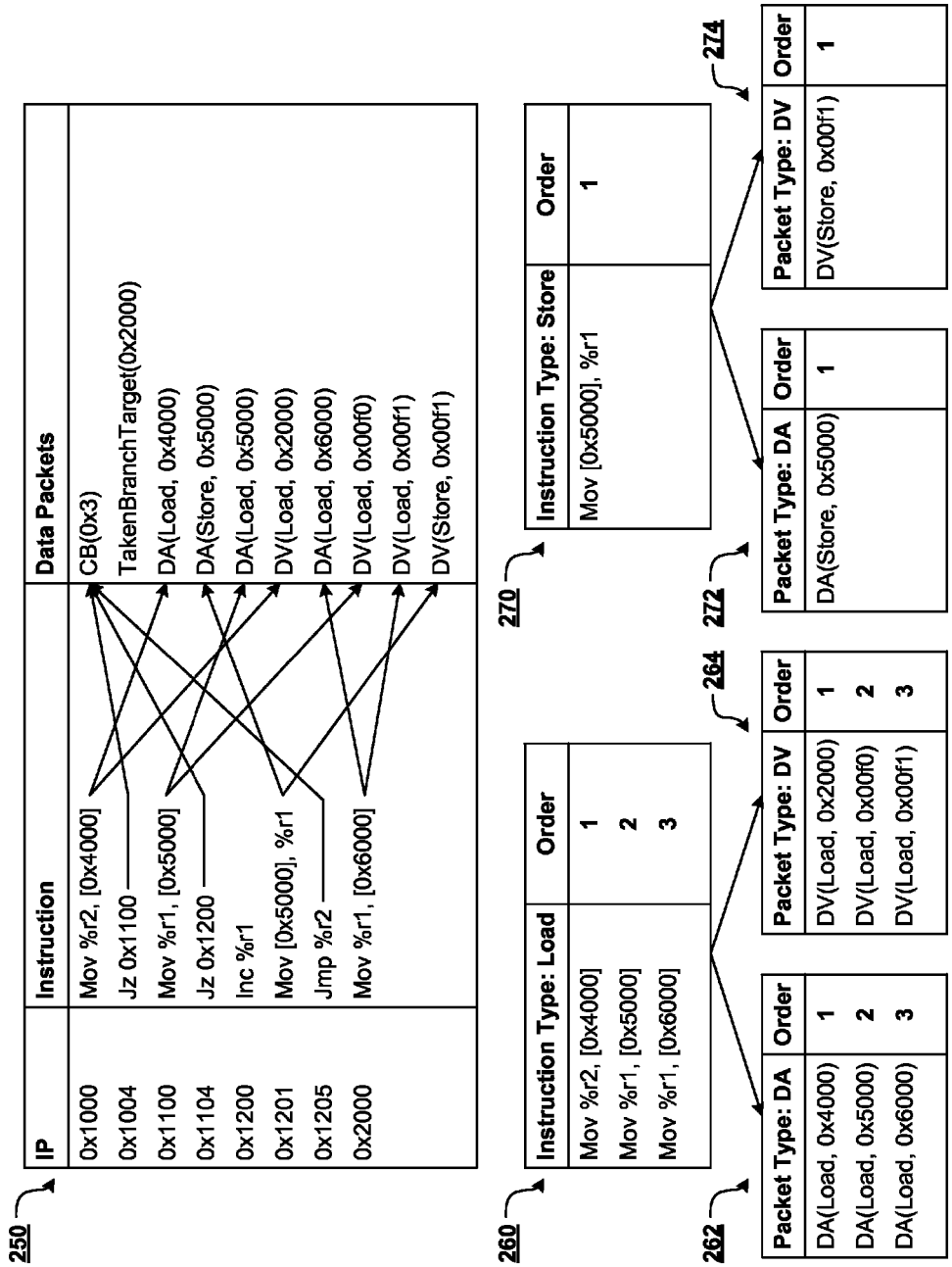
FIG. 2B illustrates an exemplary instruction sequence and associated data packets generated out-of-order.

FIG. 2B illustrates an exemplary instruction sequence 250 and associated data packets generated out-of-order. As shown in instruction sequence 250, DA and DV packets are deferred (e.g., generated post-retirement of their respective instructions). The instruction types can be inferred (e.g., using the decoding module 190) from the instruction sequence 250 to determine which instructions are loads, stores, or neither. Because load and store indication (instruction type) is included in the DA and DV packets, ordering requirements between load and store DAs and DVs are reduced. Accordingly, load DAs are not ordered with respect to store DAs, and the same is true for load DVs and store DVs. In some embodiments, a total number of packets generated is reduced as compared with instruction sequence 200 as a result of the ability to accumulate multiple conditional branch results into one or more CB packets. In some embodiments, the DA packets are emitted/generated prior to their corresponding DV packets. In other embodiments, the DA packets are emitted/generated after their corresponding DV packets.

To illustrate how data packets can be mapped to their respective instructions (e.g., using the decoding module 190), different instruction types are grouped into instruction subsets 260, 270. As shown, instruction subset 260 contains only "load" instructions, which are arranged in the order in which they are executed in the instruction sequence 250. Similarly, instruction subset 270 contains only "store" instructions (and only contains a single instruction corresponding to the single store instruction of instruction sequence 250). The data packets are also grouped into data packet subsets 262, 264, 272, 274. Data packet subset 262 includes data packets that correspond to a particular instruction type ("load") and are of a similar packet type ("DA"). Similarly, data packet subset 264 includes data packets that correspond to the "load" instruction and are of a similar packet type ("DV"). Similar groupings into data packet subsets 272, 274 are made for the other data packets (those of the instruction type "store").

The mapping between data packets and their respective instructions can be decoded by mapping data packets of a particular instruction type back to an instruction of that same instruction type also having the same order within their respective subsets. As an example, the second instruction of the instruction subset 260 ("Mov % rl, [0x5000]") is the second instruction to be executed (order=2). The data packets that map to this instruction correspond to the second data packets of data packet subsets 262, 264, respectively (order=2). This is consistent with the causality mapping illustrated in the instruction sequence 250.

Figure 3A:
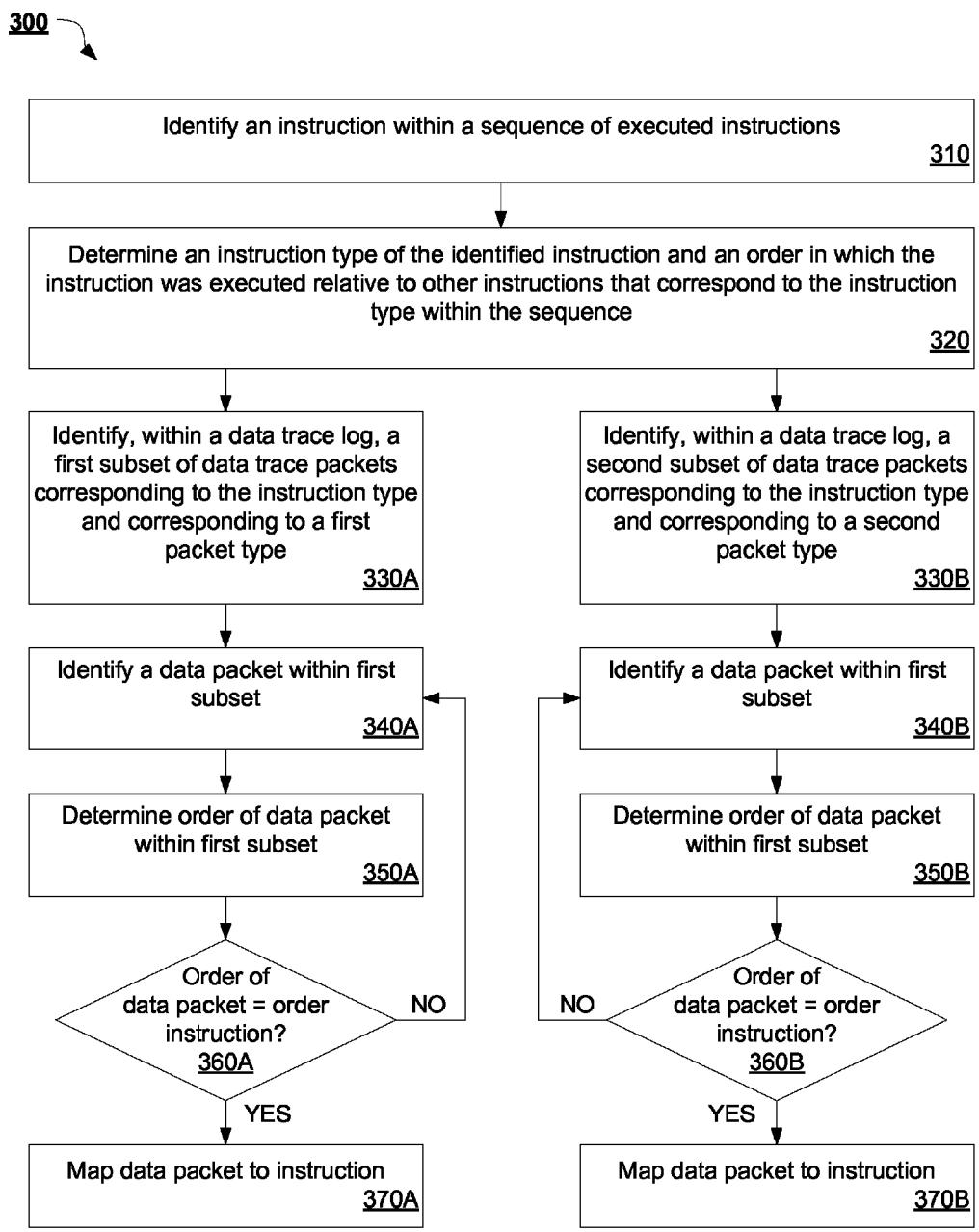
FIG. 3A is a flow diagram illustrating a method for tracking deferred data packets according to one embodiment of the disclosure.

FIG. 3A is a flow diagram illustrating a method 300 for tracking deferred data packets in a debug architecture according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the decoding module 190 of FIG. 1.

Method 300 begins at block 310 where an instruction is identified (e.g., by the decoding module 190) within a sequence of executed instructions (e.g., instruction sequence 250). The instruction may be identified within a memory that stores the sequence of executed instructions (e.g., retirement buffer 157 described with respect to FIG. 1, memory unit

470 as will be described with respect to FIG. 4A, etc.). At block 320, an instruction type of the identified instruction is determined, and an order is determined, the order corresponding to an order that the instruction was executed within the sequence of instructions relative to other executed instructions that correspond to the instruction type within the sequence (e.g., instruction subset 260). Information identifying the instruction type may be stored in memory along with the instruction, or may be decoded (e.g., by the decoding module 190, or by the instruction decode unit 120). The instruction type may be a load instruction, a store instruction, or another type of instruction.

At block 330A, a first subset of data packets corresponding to the instruction type and corresponding to a first packet type is identified (e.g., data packet subset 262). The first subset may include a sequential list of data packets that are ordered according to the order in which they were generated, and may all share common attributes. For example, the first subset may correspond to data packets generated from a read instruction (if the instruction is a read instruction), and may simultaneously correspond to data packets of a particular packet type (e.g., the first packet type is a DV packet).

At block 340A, a data packet within the first subset is identified/selected. At block 350A, an order of the data packet within the first subset is determined. The order corresponds to an order of the data packet within the first subset, with data packets being ordered according to the order in which they were generated.

At block 360A, a determination is made as to whether the order of the data packet is equal to the order of the instruction (e.g., the data packet is the fourth data packet in the first subset, and the instruction is the fourth instruction in the sequence of instructions). If it is determined that the order of the data packet is equal to the order of the instruction, method 300 proceeds to block 370A where the data packet is mapped to the instruction. Otherwise, method 300 proceeds to block 340A where another data packet is identified/selected within the first subset. Method 300 may cycle through blocks 340A, 350A, and 360A until a data packet within the first subset having an order equal to the order of the instruction is identified.

At block 330B, a second subset of data packets corresponding to the instruction type and corresponding to a first packet type is identified (e.g., data packet subset 264). Similar to the first subset, the second subset may include a sequential list of data packets that are ordered according to the order in which they were generated, and may all share common attributes. For example, the second subset may correspond to data packets generated from a read instruction (if the instruction is a read instruction), and may simultaneously correspond to data packets of a particular packet type that is different from the first packet type (e.g., the second packet type is a DA packet, while the first packet type is a DV packet). Blocks 330B, 340B, 350B, 360B, and 370B may be executed in a similar fashion as blocks 330A, 340A, 350A, 360A, and 370A, respectively.

In some embodiments, once the appropriate data packets of the first and second subsets have been mapped to the instruction, the mapping may be stored in a memory (e.g., memory unit 470), and accessible as part of a debugging procedure. Method 300 may end or may be repeated for one or more additional instructions within the sequence of executed instructions. In some embodiments, method 300 is performed concurrently with the execution of the instructions, or may be performed post-execution of some or all of the instructions in the sequence. It is noted that some or all of the blocks of method 300 may be performed concurrently, substantially concurrently, or sequentially. Moreover, one or more additional blocks may be included in method 300, and/or one or more blocks may be omitted from method 300.

Figure 3B:
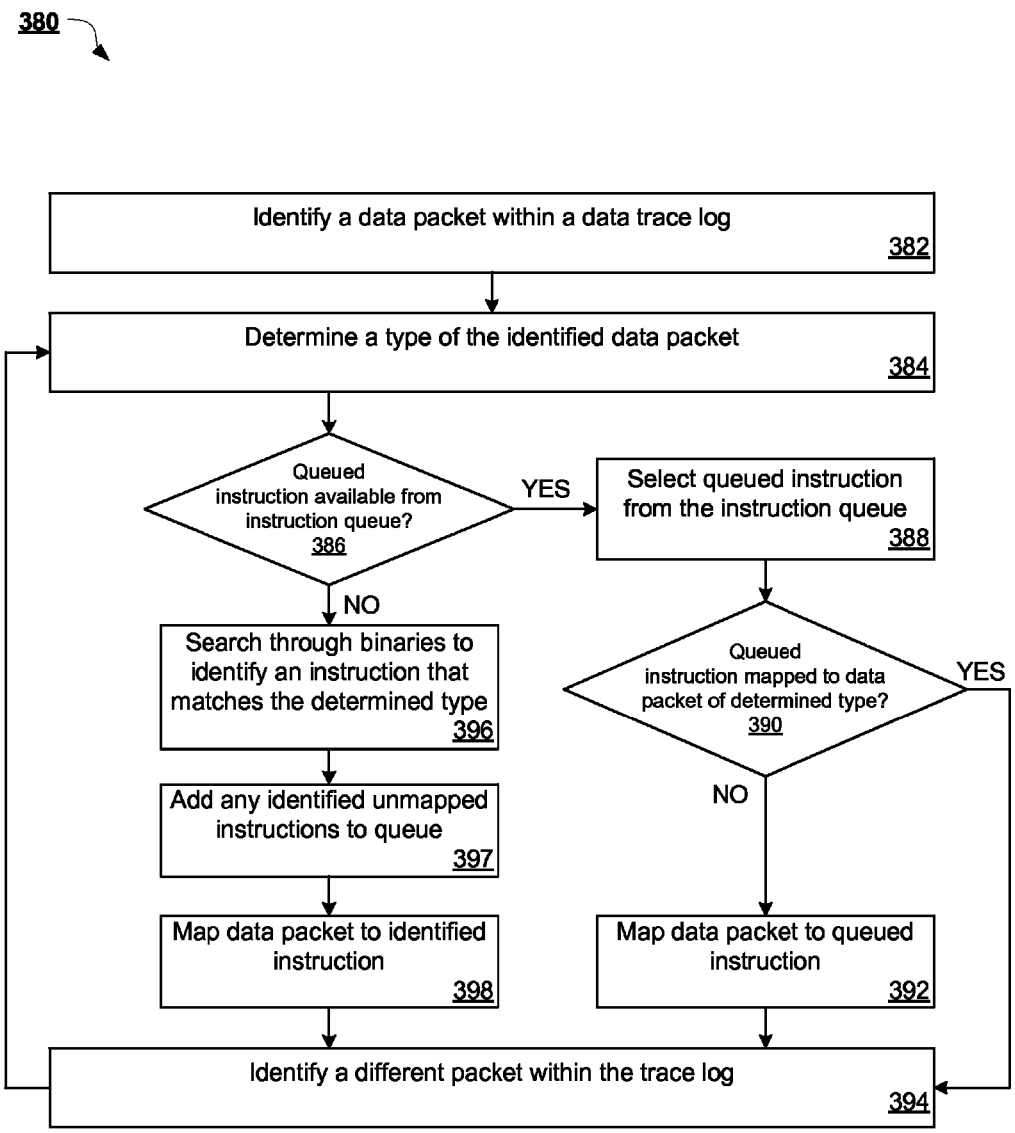
FIG. 3B is a flow diagram illustrating a method for tracking deferred data packets according to another embodiment of the disclosure.

FIG. 3B is a flow diagram illustrating another method 380 for tracking deferred data packets in a debug architecture according to another embodiment of the disclosure. Method 380 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the decoding module 190 of FIG. 1.

Method 380 begins at block 382 where a data packet is identified (e.g., by the decoding module 190) within a data trace log (e.g., trace log 182). The data packet may be identified as a next data packet in a sequence of data packets (e.g., arranged according to the order in which they were emitted/generated), may be identified based on a type of the instruction, may be selected randomly from the data trace log, etc. In some embodiments, additional data packets are added to the data trace log as they are emitted/generated in real-time during a debug trace. At block 384, a type of the packet is determined. For example, the packet type may correspond to a CB packet, a DA packet (e.g., a load DA packet or a store DA packet), a DV packet (e.g., a load DV or a store DV), or some other type of packet.

At block 386, a determination is made as to whether there is a queued instruction available from an instruction queue. In some embodiments, the instruction queue (e.g., which may be maintained by ITS 155) contains instructions to which no data packets have been mapped (e.g., instructions corresponding to deferred data packets), or are each awaiting a particular data packet to be mapped. In some embodiments, one or more instruction queues may exist, each corresponding to a particular type of instruction (e.g., a load instruction queue, a store instruction queue, etc.). The queued instruction, if available, corresponds to an earliest available instruction in the instruction queue. If a queued instruction is available, then method 380 proceeds to block 388 where a queued instruction is selected from the instruction queue. Otherwise, method 380 proceeds to block 396. At block 390, a determination is made as to whether the selected queued instruction has already been mapped to a data packet of the type determined at block 384. If so, method 380 proceeds to block 392 where the identified data packet is mapped to the queued instruction, and the queued instruction is removed from the instruction queue. Otherwise, method 380 proceeds to block 394 where a different packet is identified within the trace log.

At block 396, an instruction that matches the type determined at block 384 is identified by performing a search through source binaries to identify instructions that have been executed or are currently being executed that have not been added to the instruction queue. At block 397, if any instructions that have not yet been mapped to data packets are identified during the search of the source binaries, these instructions may be added to the instruction queue (or an appropriate queue depending on a type of the instruction). At block 398, the data packet is mapped to the identified instruction, and a different data packet is identified at block 394.

Method 380 may end or may be repeated for one or more additional instructions within the sequence of executed instructions. Method 380 may cycle back to block 382 until all data packets have been consumed (mapped to their respective instructions). It is noted that some or all of the blocks of method 380 may be performed concurrently, substantially concurrently, or sequentially. Moreover, one or more additional blocks may be included in method 380, and/or one or more blocks may be omitted from method 380.

Figure 4A:
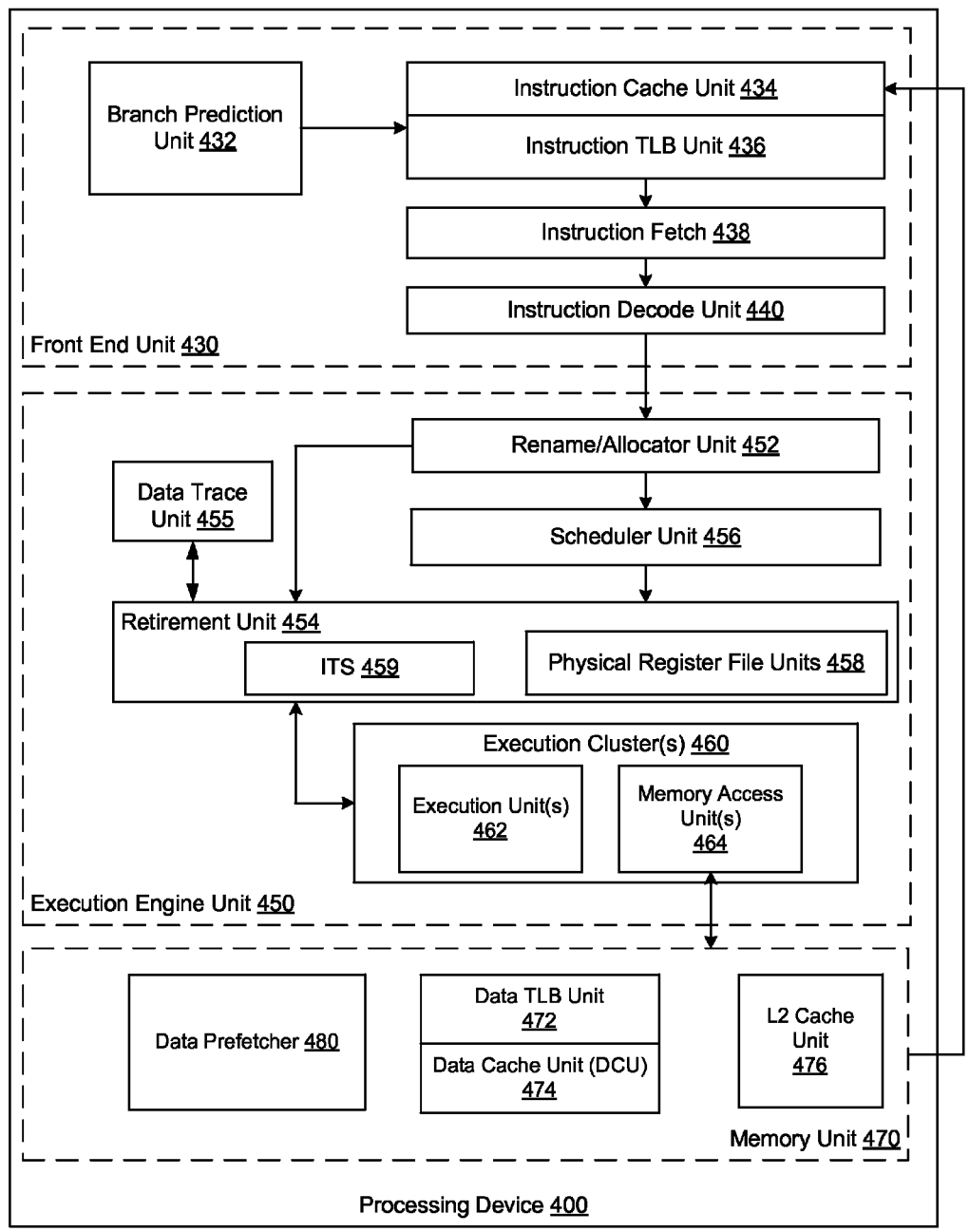
FIG. 4A is a block diagram illustrating a micro-architecture for a processor that implements tracking of deferred data packets in a debug trace architecture in accordance with one embodiment of the disclosure.

FIG. 4A is a block diagram illustrating a micro-architecture for a processor 400 that implements tracking of deferred data packets in a debug trace architecture in accordance with one embodiment of the disclosure. Specifically, processor 400 depicts an in-order architecture core, register renaming logic, and out-of-order issue/execution logic to be included in a processor according to at least one embodiment of the disclosure.

Processor 400 includes a front end unit 430 coupled to an execution engine unit 450, and both are coupled to a memory unit 470. The processor 400 may include a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In one embodiment, processor 400 may be a multi-core processor or may part of a multi-processor system.

The front end unit 430 includes a branch prediction unit 432 coupled to an instruction cache unit 434, which is coupled to an instruction translation lookaside buffer (TLB) 436, which is coupled to an instruction fetch unit 438, which is coupled to an instruction decode unit 440. The instruction decode unit 440 may decode instructions, and generate as an output one or more micro-operations, micro-code entry points, microinstructions, other instructions, or other control signals, which are decoded from, or which otherwise reflect, or are derived from, the original instructions. The instruction decode unit 440 may be implemented using various different mechanisms. Examples of suitable mechanisms include, but are not limited to, look-up tables, hardware embodiments, programmable logic arrays (PLAs), microcode read only memories (ROMs), etc. The instruction cache unit 434 is further coupled to the memory unit 470. The instruction decode unit 440 is coupled to a rename/allocator unit 452 in the execution engine unit 450.

The execution engine unit 450 includes the rename/allocator unit 452 coupled to a retirement unit 454 (which may be the same as the retirement unit 150 described with respect to FIG. 1) and a set of one or more scheduler unit(s) 456. In one embodiment, the retirement unit 454 includes an ITS 459, which may be the same as the ITS 155 described with respect to FIG. 1. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

In one embodiment, a data trace unit 455 (which may have the same functionality as the data trace unit 160 described with respect to FIG. 1) may be included in the execution engine unit 450 to provide debug functionality. The data trace unit 455 may generate data packets in-order or out-of-order, and may include decoding logic to map data packets generated out-of-order (e.g., deferred data packets) back to their respective instructions. The data trace unit 455 is illustrated as being coupled to the retirement unit 454, but may be coupled to one or more of the retirement unit 454, the execution cluster(s) 460, or any other suitable component for which memory-accesses occur as a result of instruction execution.

While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include a data prefetcher 480, a data TLB unit 472, a data cache unit (DCU) 474, and a level 2 (L2) cache unit 476, to name a few examples. In some embodiments, DCU 474 is also known as a first level data cache (L1 cache). The DCU 474 may handle multiple outstanding cache misses and continue to service incoming stores and loads. It also supports maintaining cache coherency. The data TLB unit 472 is a cache used to improve virtual address translation speed by mapping virtual and physical address spaces. In one exemplary embodiment, the memory access units 464 may include a load unit, a store address unit, and a store data unit, each of which is coupled to the data TLB unit 472 in the memory unit 470. The L2 cache unit 476 may be coupled to one or more other levels of cache and eventually to a main memory.

In one embodiment, the data prefetcher 480 speculatively loads/prefetches data to the DCU 474 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 400 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4B:
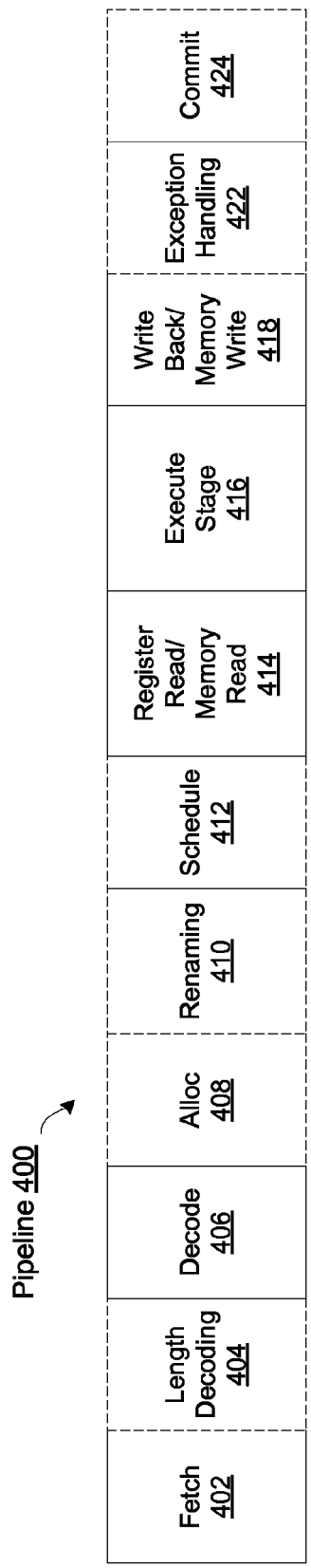
FIG. 4B is a block diagram illustrating an in-order pipeline and a register renaming stage, out-of-order issue/execution pipeline implemented in accordance with one embodiment of the disclosure.

FIG. 4B is a block diagram illustrating an in-order pipeline and a register renaming stage, out-of-order issue/execution pipeline implemented by the processor 400 of FIG. 4A according to some embodiments of the disclosure. The solid lined boxes in FIG. 4B illustrate an in-order pipeline, while the dashed lined boxes illustrates a register renaming, out-of-order issue/execution pipeline. In FIG. 4B, a processor 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424. In some embodiments, the ordering of stages 402-424 may be different than illustrated and are not limited to the specific ordering shown in FIG. 4B.

Figure 5:
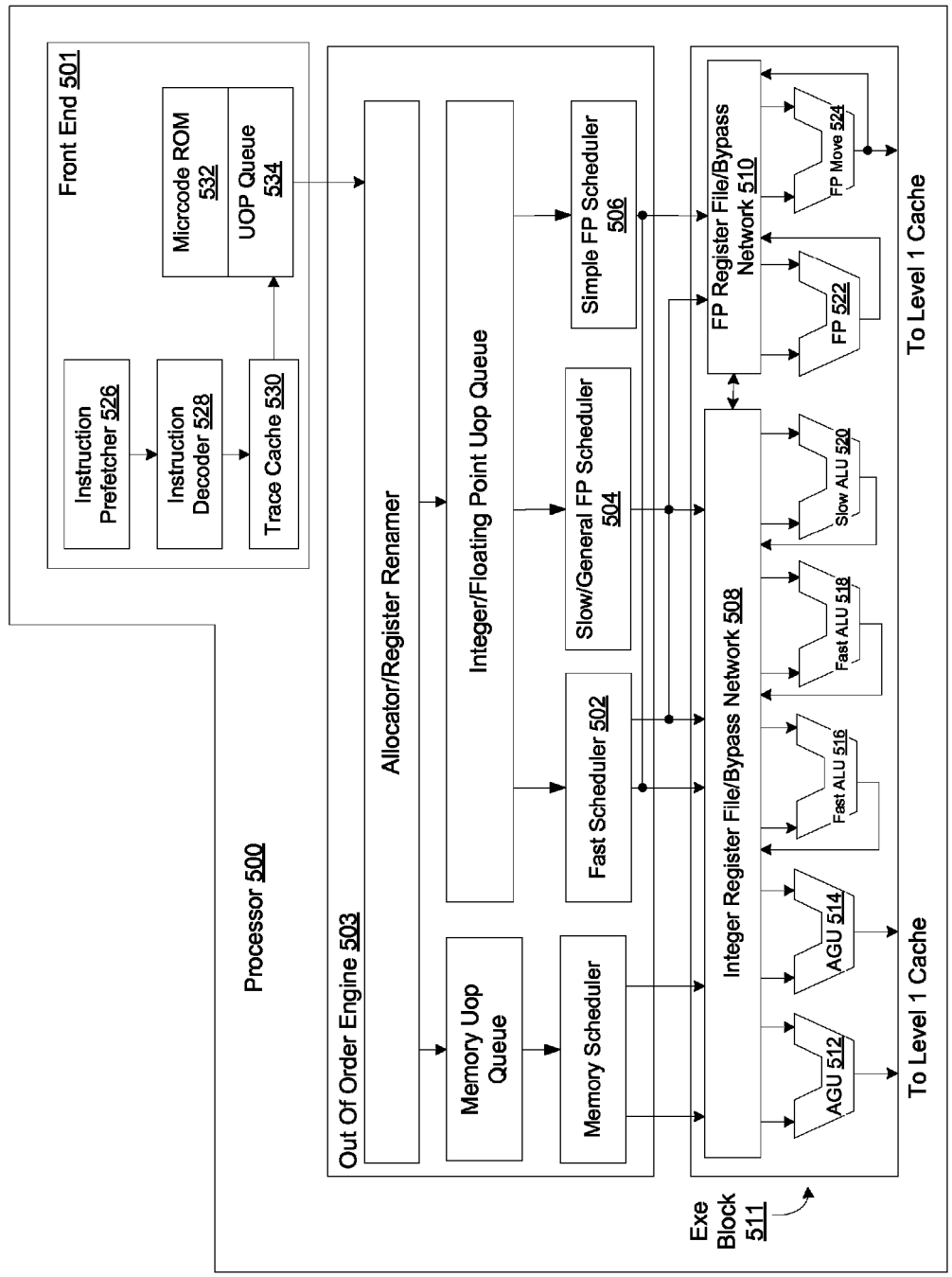
FIG. 5 illustrates a block diagram of the micro-architecture for a processor that includes logic circuits to perform tracking of deferred data packets in accordance with one embodiment of the disclosure.

FIG. 5 illustrates a block diagram of the micro-architecture for a processor 500 that includes logic circuits to perform tracking of deferred data packets in a debug trace architecture in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline.

The front end 501 may include several units. In one embodiment, the instruction prefetcher 526 fetches instructions from memory and feeds them to an instruction decoder 528 which in turn decodes or interprets them. For example, in one embodiment, the decoder decodes a received instruction into one or more uops that the machine can execute. In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others need several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to a entry point programmable logic array (PLA) to determine a correct micro-instruction pointer for reading the micro-code sequences to complete one or more instructions in accordance with one embodiment from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they proceed down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one embodiment can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 64 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute. The processor 500 of one embodiment is comprised of a number of execution units: address generation unit (AGU) 512, AGU 514, fast arithmetic logic unit (ALU) 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520, are described in the context of performing integer operations on 64 bit data operands. In alternative embodiments, the ALUs 516, 518, 520, can be implemented to support a variety of data bits including 16, 32, 128, 256, etc. Similarly, the floating point units 522, 524, can be implemented to support a range of operands having bits of various widths. For one embodiment, the floating point units 522, 524, can operate on 128 bits wide packed data operands in conjunction with SIMD and multimedia instructions.

In one embodiment, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 500 also includes logic to implement a debug architecture that allows for tracking of deferred data packets according to embodiments of the disclosure. In one embodiment, the execution block 511 of processor 500 may include a data trace unit (e.g., the data trace unit 160 described with respect to FIG. 1) to perform tracking of deferred data packets according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 6A:
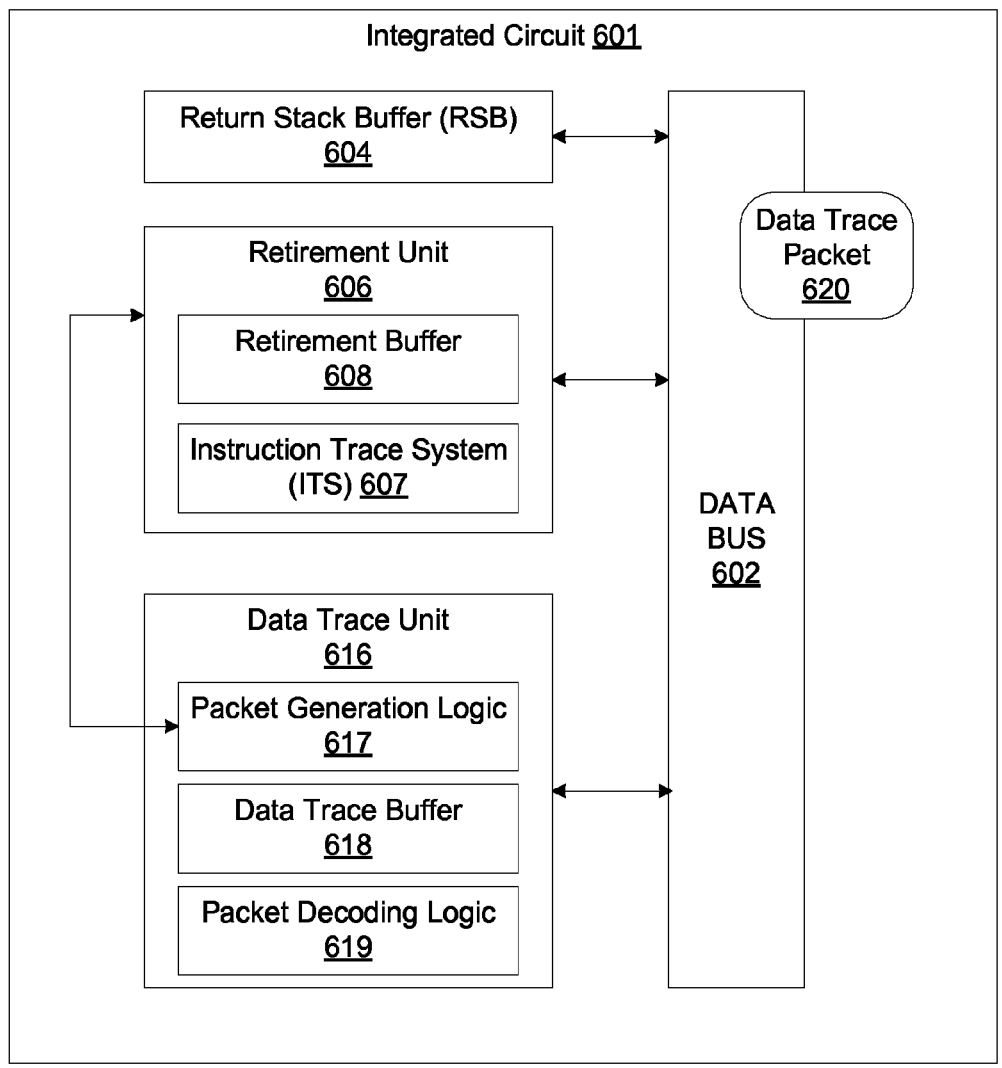
FIG. 6A illustrates an alternative exemplary architecture in accordance with which embodiments may operate.

FIG. 6A illustrates an alternative exemplary architecture in accordance with which embodiments may operate. In one embodiment, the integrated circuit 601 includes a return stack buffer (RSB) 604; a retirement unit 606 which including a retirement buffer 608 and an instruction trace system (ITS) 607; a data trace unit 616 including packet generation logic 617, a data trace buffer 618, and packet decoding logic 619; and a data bus 602. The data trace unit 616 includes the packet generation logic 617 to generate a plurality of data packets 620 describing the traced instructions; the data trace buffer 618 to store the plurality of data packets 620 sequentially as they are generated; and the packet decoding logic 619 to map the plurality of data packets 620 (e.g., deferred data packets) back to their respective instructions. In one embodiment, the ITS 607 traces instructions of a traced application, mode, or code region, as the instructions are executed by the integrated circuit 601.

In one embodiment, the packet generation logic 617, the data trace buffer 618, and the packet decoding logic 619 provide the functionality of the data packet generation unit 170, the data trace buffer 180, and the decoding module 190, respectively, described with respect to FIG. 1.

In one embodiment, the integrated circuit is a Central Processing Unit (CPU). In one embodiment, the central processing unit is utilized for one of a tablet computing device or a smartphone. In accordance with one embodiment, such an integrated circuit 601 thus initiates instruction tracing (e.g., via ITS 607) for instructions of a traced application, mode, or code region, as the instructions are executed by the integrated circuit 601, and generates a plurality of data packets 620 describing the instruction tracing (e.g., via packet generation logic 617 as controlled by the ITS 607). In some embodiments, data packets 620 are generated in-order (e.g., at retirement of their respective executed instructions), and can be mapped to their respective executed instructions accordingly. In some embodiments, if data packets 620 are generated out-of-order, the decoding logic 619 may be utilized to map the data packets 620 back to their respective executed instructions.

In one embodiment, the integrated circuit 601 identifies an instruction within a sequence of executed instructions, in which the instruction corresponds to an instruction type; determines an order number corresponding to an order in which the instruction was executed relative to other executed instructions that correspond to the instruction type within the sequence; identifies, within a data trace log (e.g., stored in the data trace buffer 618), a first data packet corresponding to a first packet type and sequentially ordered, according to the order number, with respect to data packets of the first packet type within the data trace log; identifies, within the data trace log, a second data packet corresponding to a second packet type and sequentially ordered, according to the order number, with respect to data packets of the second packet type within the data trace log; and maps (e.g., using the packet decoding logic 619) the identified first and second data packets to the instruction, wherein at least one of the first or second data packets is generated post-retirement of the instruction.

Figure 6B:
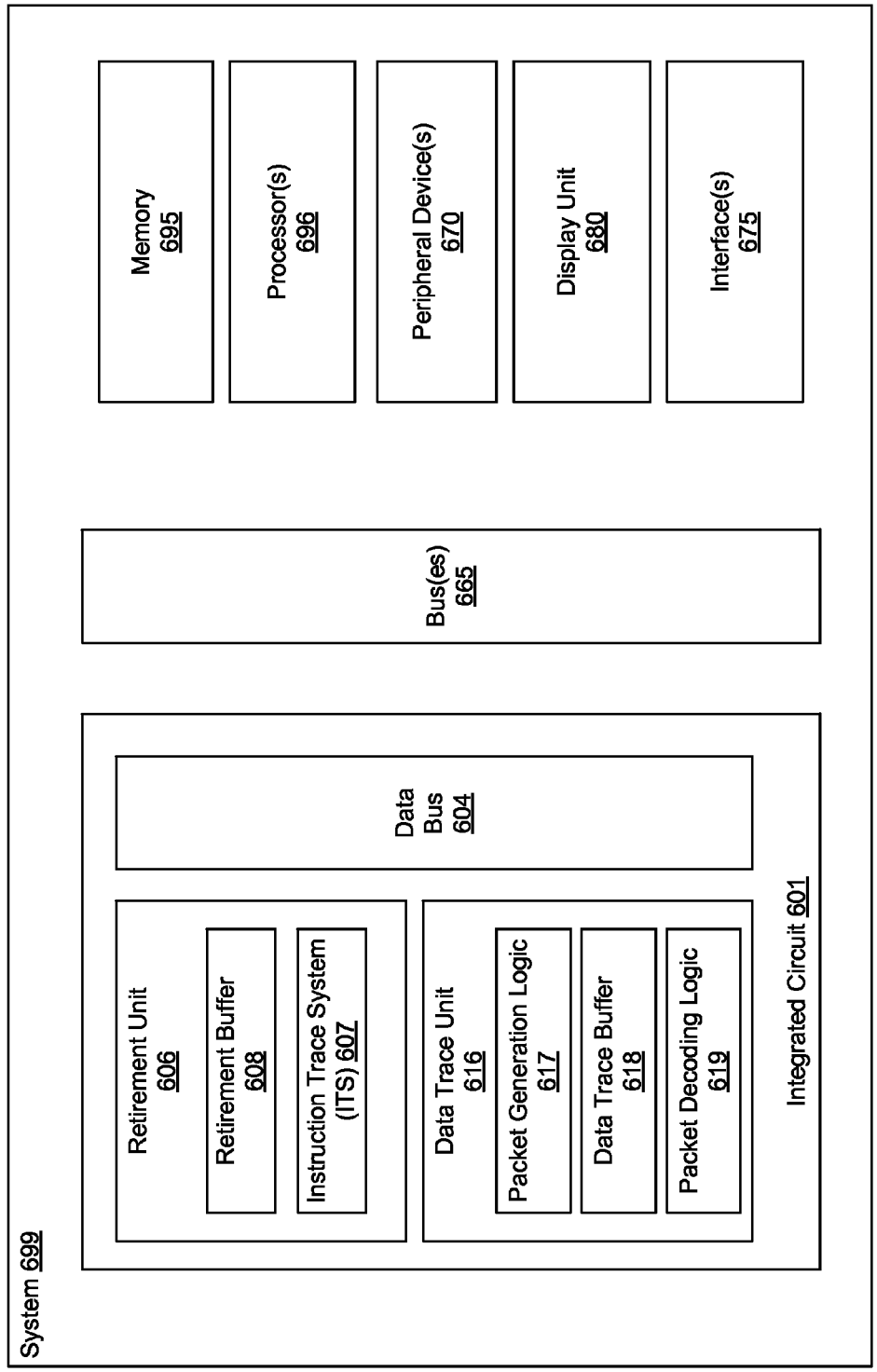
FIG. 6B shows a diagrammatic representation of a system in accordance with which embodiments may operate, be installed, integrated, or configured.

FIG. 6B shows a diagrammatic representation of a system 699 in accordance with which embodiments may operate, be installed, integrated, or configured. In one embodiment, system 699 includes a memory 695 and a processor or processors 696. For example, memory 695 may store instructions to be executed and processor(s) 696 may execute such instructions. System 699 includes communication bus(es) 665 to transfer transactions, instructions, requests, and data within system 699 among a plurality of peripheral device(s) 670 communicably interfaced with one or more communication buses 665 and/or interface(s) 675. Display unit 680 is additionally depicted within system 699.

Distinct within system 699 is integrated circuit 601 which may be installed and configured in a compatible system 699, or manufactured and provided separately so as to operate in conjunction with appropriate components of system 699.

In accordance with one embodiment, system 699 includes at least a display unit 680 and an integrated circuit 601. The integrated circuit 601 may operate as, for example, a processor or as another computing component of system 699. In such an embodiment, the integrated circuit 601 of system 699 includes at least: a data bus 602, a retirement unit 606 (as described with respect to FIG. 6A), and a data trace unit 616 (as described with respect to FIG. 6A) to provide debug functionality. In one embodiment, the retirement unit 606 further includes a retirement buffer 608 and implements the ITS 607. In one embodiment, the data trace unit 616 includes packet generation logic 617, a data trace buffer 618, and packet decoding logic 619.

In accordance with one embodiment, such a system 699 embodies a tablet or a smartphone, in which the display unit 680 is a touchscreen interface of the tablet or the smartphone; and further in which the integrated circuit 601 is incorporated into the tablet or smartphone.

Figure 7:
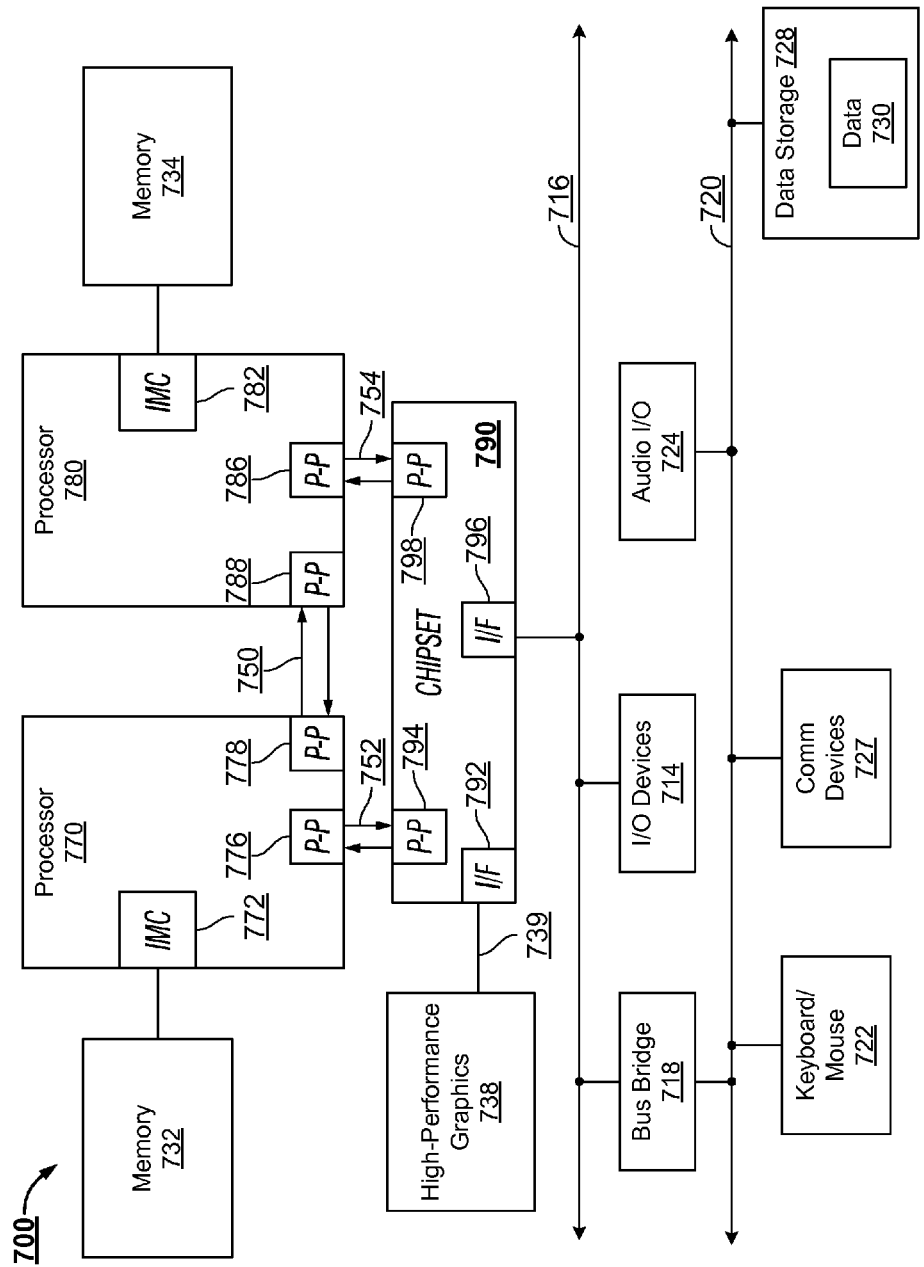
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement tracking of deferred data packets in a debug trace architecture as described herein.

Processors 770 and 780 are shown including integrated memory controller units 772 and 782, respectively. Processor 770 also includes as part of its bus controller units point-to-point (P-P) interconnects 776 and 778; similarly, second processor 780 includes P-P interfaces 786 and 788. Processors 770, 780 may exchange information via a point-to-point (P-P) interconnect 750 using P-P interface circuits 778, 788. As shown in FIG. 7, integrated memory controllers (IMCs) 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
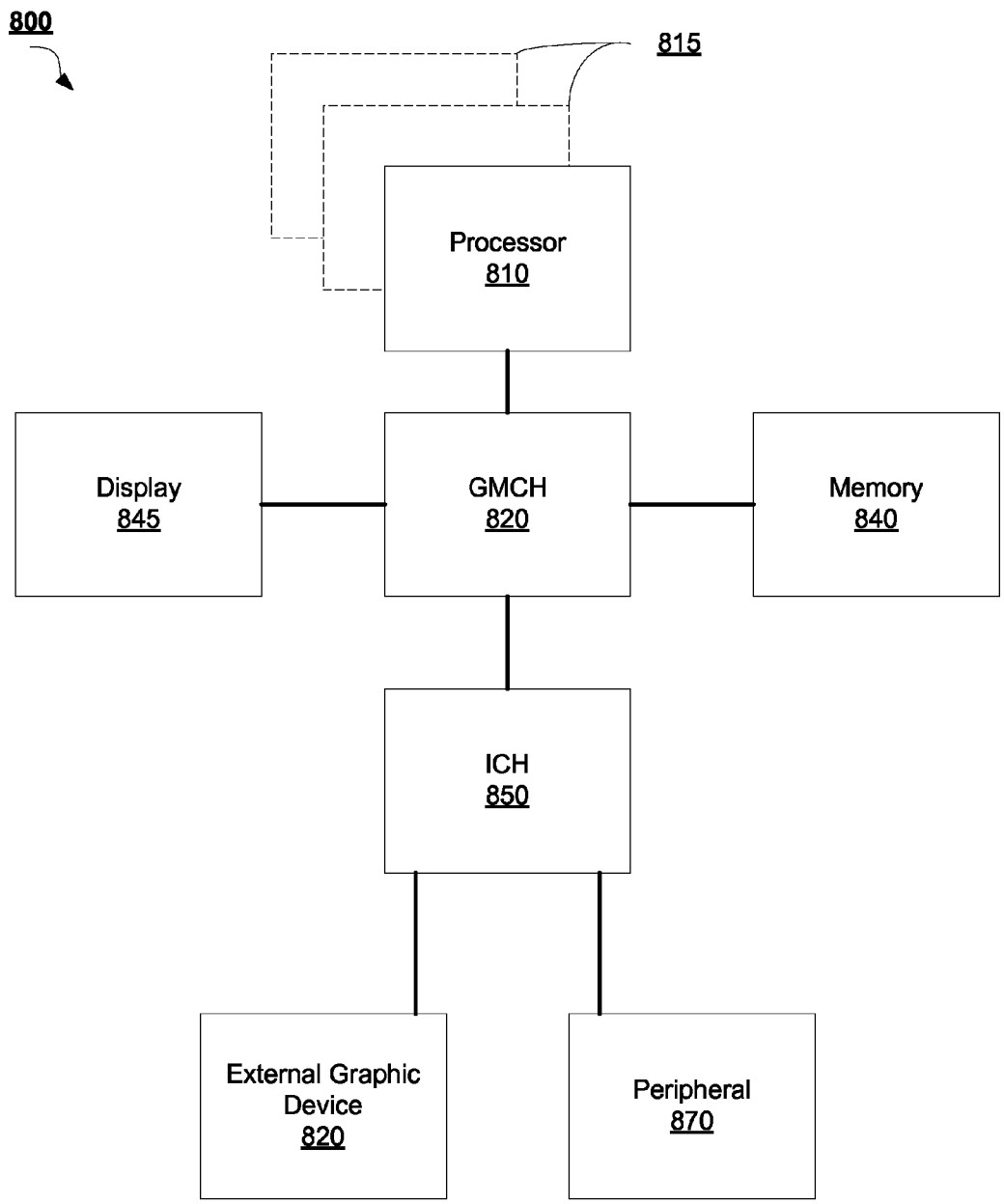
FIG. 8 is a block diagram of a system in which an embodiment of the disclosure may operate.

Referring now to FIG. 8, a block diagram of a system 800 is shown in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement tracking of deferred data packets in a debug trace architecture.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800.

For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
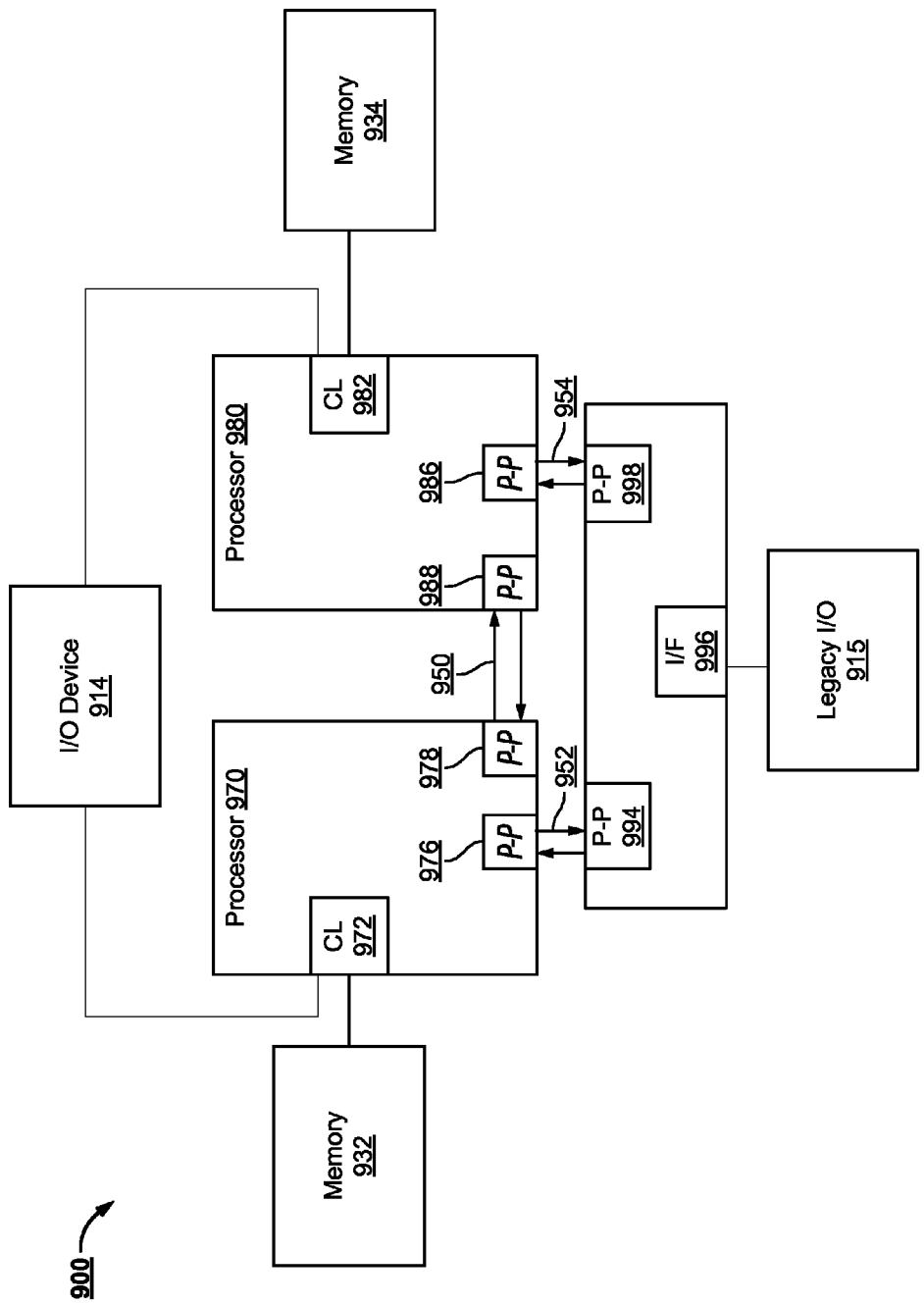
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement tracking of deferred data packets in a debug trace architecture. Processors 970, 980 may include integrated memory and I/O control logic ("CL") 972 and 982, respectively, and intercommunicate with each other via point-to-point interconnect 950 between point-to-point (P-P) interfaces 978 and 988, respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
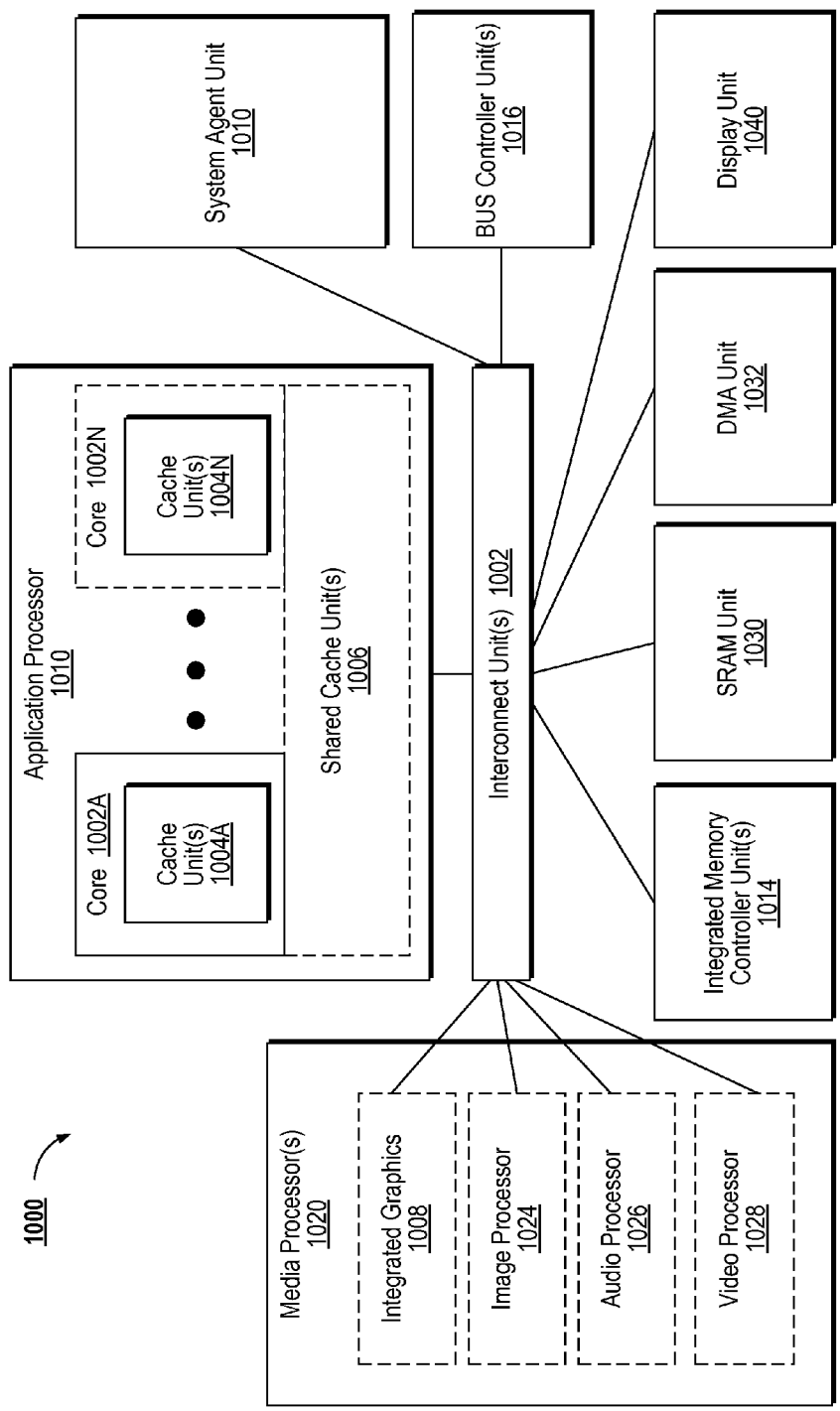
FIG. 10 is a block diagram of a System-on-a-Chip (SoC) in which an embodiment of the disclosure may be used.

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a PMU for implementing performance scalability prediction as described in embodiments herein.

The memory hierarchy may include one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 may include those components coordinating and operating cores 1002A-N. The system agent unit 1010 may include, for example, a power control unit (PCU) and a display unit. The PCU may be or include logic and components for regulating the power state of the cores 1002A-N and the integrated graphics logic 1008. The display unit may drive one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
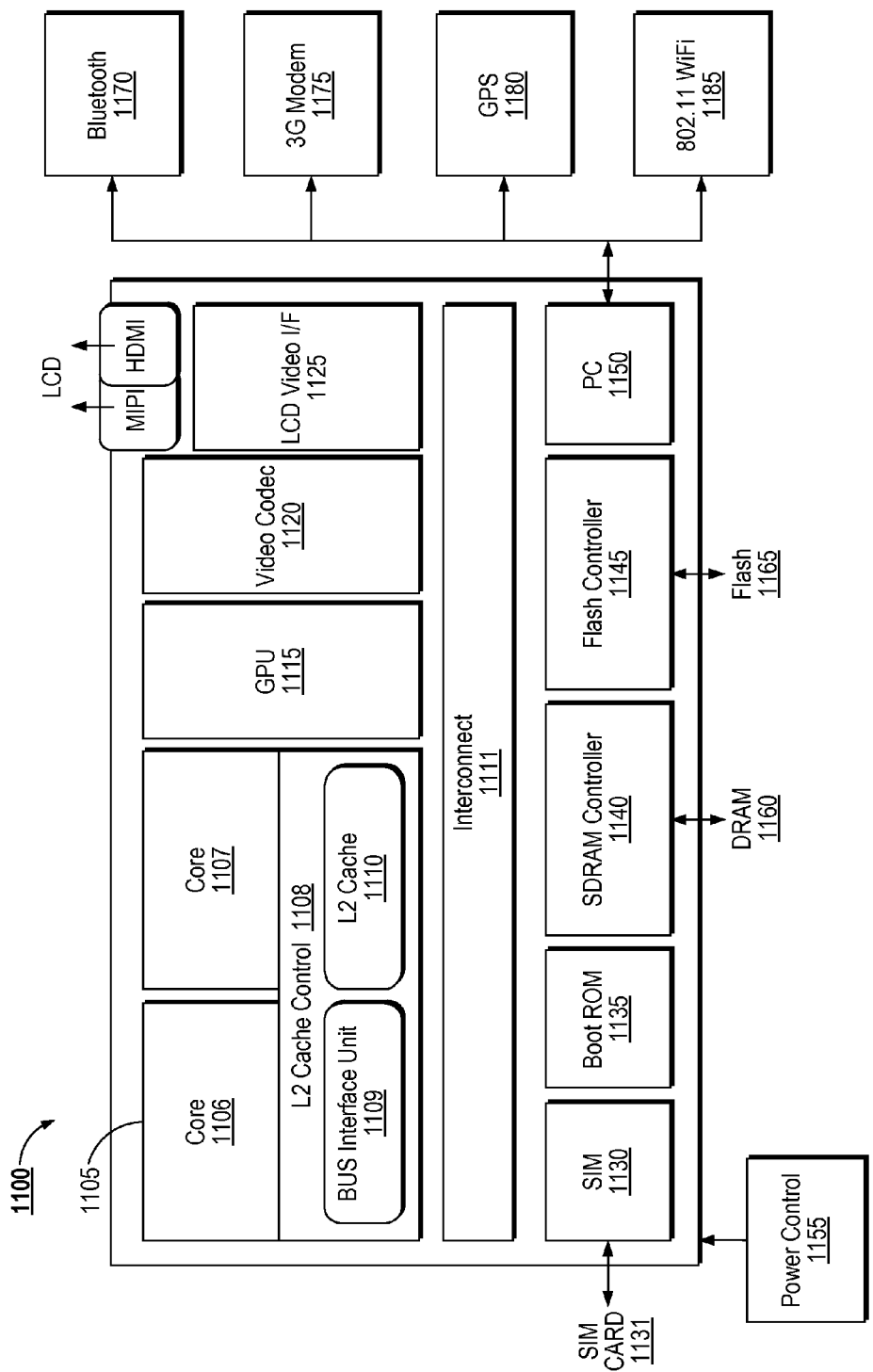
FIG. 11 is a block diagram of an embodiment of a SoC design in accordance with the present disclosure.
Figure 12:
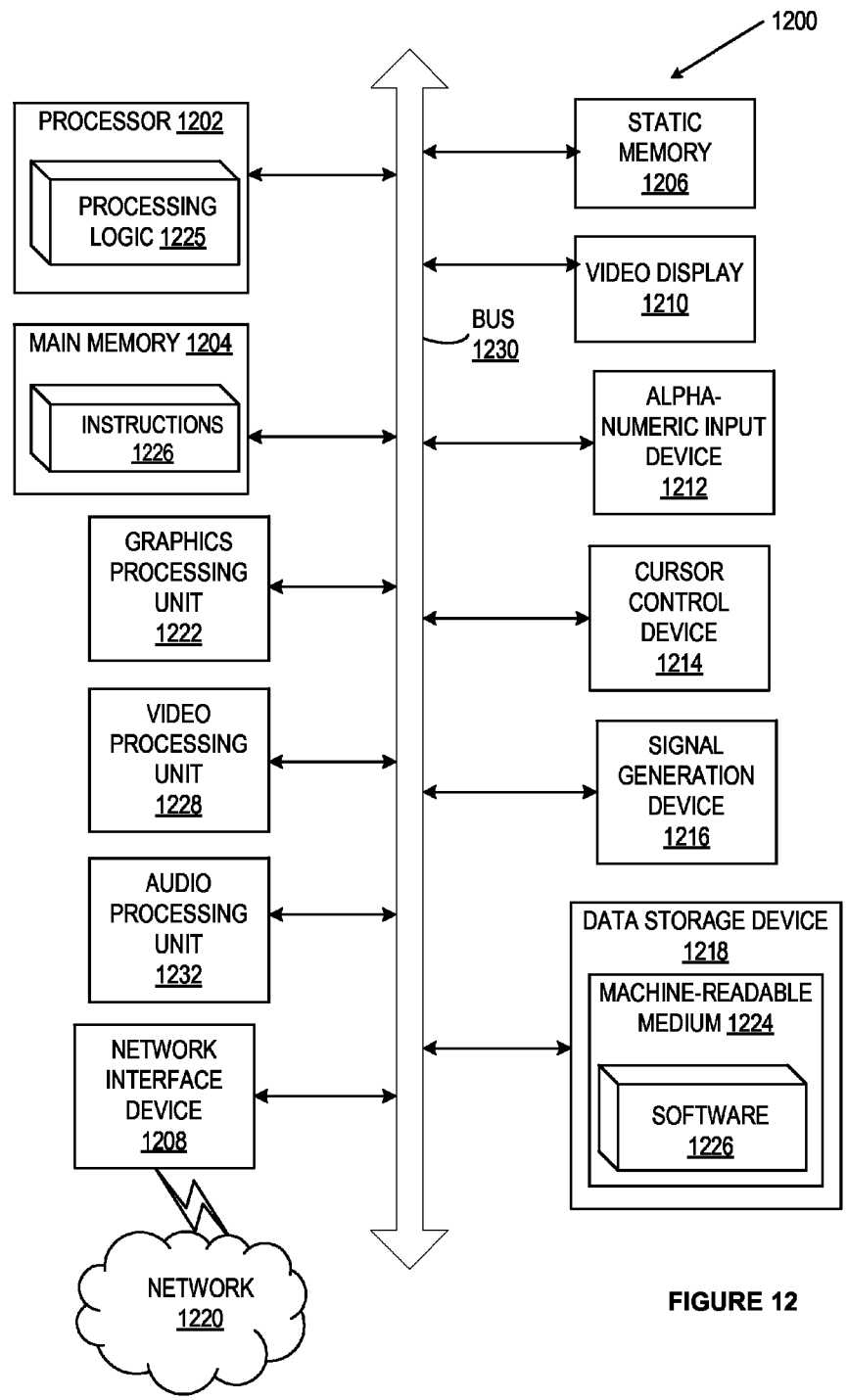
FIG. 12 illustrates a block diagram of one embodiment of a computer system.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

As illustrated, SoC 1100 includes two cores: cores 1106 and 1107. Cores 1106 and 1107 may conform to an ISA, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of SoC 1100. Interconnect 1111 may include an on-chip interconnect, such as an Intel® On-Chip System Fabric (IOSF), Advanced Microcontroller Bus Architecture (AMBA), or other interconnect discussed above, which potentially implements one or more aspects of the described disclosure. In one embodiment, cores 1106, 1107 may implement performance scalability prediction as described in embodiments herein.

Interconnect 1111 provides communication channels to the other components, such as a Subscriber Identity Module (SIM) 1130 to interface with a SIM card 1131, a boot ROM 1135 to hold boot code for execution by cores 1106 and 1107 to initialize and boot SoC 1100, a SDRAM controller 1140 to interface with external memory (e.g., DRAM 1160), a flash controller 1145 to interface with non-volatile memory (e.g., Flash 1165), a peripheral control 1150 (e.g., Serial Peripheral Interface) to interface with peripherals, video codecs 1120 and Video interface 1125 to display and receive input (e.g., touch enabled input), GPU 1115 to perform graphics related computations, etc. Any of these interfaces may incorporate aspects of the disclosure described herein. In addition, the SoC 1100 illustrates peripherals for communication, such as a Bluetooth module 1170, 3G modem 1175, GPS 1180, and Wi-Fi 1185.

FIG. 10 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as the architecture 100 described with respect to FIG. 1 that implements tracking of deferred data packets in a debug trace architecture as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored instructions 1226 implementing any one or more of the methodologies of functions described herein, such as implementing tracking of deferred data packets in a debug trace architecture as described above. The instructions 1226 may also reside, completely or at least partially, within the main memory 1204 as instructions 1226 and/or within the processing device 1202 as processing logic 1225 during execution thereof by the computer system 1200; the main memory 1204 and the processing device 1202 also constituting machine-accessible storage media.

The machine-readable storage medium 1224 may also be used to store instructions 1226 implementing decoding logic for tracking of deferred data packets such as described with respect to ITS 155 in FIG. 1, and/or a software library containing methods that call the above applications. While the machine-readable storage medium 1224 is shown in an example embodiment to be a single medium, the terms "machine-readable storage medium" and "machine-accessible storage medium" should be taken to include a single medium or multiple media (e.g., a centralized or distributed database, and/or associated caches and servers) that store the one or more sets of instructions. The terms "machine-readable storage medium" and "machine-accessible storage medium" shall also be taken to include any medium that is capable of storing, encoding or carrying a set of instruction for execution by the machine and that cause the machine to perform any one or more of the methodologies of the present disclosure. The terms "machine-readable storage medium" and "machine-accessible storage medium" shall accordingly be taken to include, but not be limited to, solid-state memories, and optical and magnetic media.

The following examples pertain to further embodiments. Example 1 is a processing device for tracking deferred data packets in a debug trace architecture, the processing device comprising an instruction tracking unit comprising an instruction buffer to store a sequence of executed instructions. The processing device further comprises a data trace unit communicably coupled to the instruction tracking unit and comprising a data trace buffer and a decoding module. The data trace buffer is to store a data trace log. Further to Example 1, the decoding module is to determine an order number corresponding to an order in which an instruction was executed relative to other executed instructions that correspond to an instruction type within the sequence of executed instructions. The decoding module is further to identify, within the data trace log, a first data packet corresponding to a first packet type and sequentially ordered, according to the order number, with respect to data packets of the first packet type within the data trace log, identify, within the data trace log, a second data packet corresponding to a second packet type and sequentially ordered, according to the order number, with respect to data packets of the second packet type within the data trace log, and map the identified first and second data packets to the instruction, wherein at least one of the first or second data packets was generated post-retirement of the instruction.

In Example 2, the subject matter of Example 1 can optionally provide that the decoding module is further to identify the first and second data packets based on the instruction type, and wherein the first and second data packets correspond to data packets of the instruction type.

In Example 3, the subject matter of any one of Examples 1-2 can optionally provide that the instruction type is a load instruction or a store instruction.

In Example 4, the subject matter of any one of Examples 1-3 can optionally provide that the first packet type is a data address (DA) packet, and wherein the second packet type is a data value (DV) packet.

In Example 5, the subject matter of any one of Examples 1-4 can optionally provide that the first data packet was generated prior to or after the second data packet.

In Example 6, the subject matter of any one of Examples 1-5 can optionally provide that the data trace log comprises retirement data associated with the instruction, wherein mapping the first and second data packets to the instruction is based at least partially on the retirement data.

In Example 7, the subject matter of any one of Examples 1-6 can optionally provide that the first data packet was generated at retirement of the instruction, and wherein the first data packet is identifiable based on the retirement data.

Any or all features of the processing device described above with respect to Examples 1-7 may also be implemented with respect to any method or process described herein.

Example 8 is a method, executed by a processing device, for tracking deferred data packets in a debug trace architecture, the method comprising determining an order number corresponding to an order in which an instruction was executed relative to other executed instructions that correspond to an instruction type within a sequence of executed instructions. The method further comprises identifying, within a data trace log, a first data packet corresponding to a first packet type and sequentially ordered, according to the order number, with respect to data packets of the first packet type within the data trace log, identifying, within the data trace log, a second data packet corresponding to a second packet type and sequentially ordered, according to the order number, with respect to data packets of the second packet type within the data trace log, and mapping the identified first and second data packets to the instruction, wherein at least one of the first or second data packets is generated post-retirement of the instruction.

In Example 9, the subject matter of Example 8 can optionally provide that the decoding module is further to identify the first and second data packets based on the instruction type, and wherein the first and second data packets correspond to data packets of the instruction type.

In Example 10, the subject matter of any one of Examples 8-9 can optionally provide that the instruction type is a load instruction or a store instruction.

In Example 11, the subject matter of any one of Examples 8-10 can optionally provide that the first packet type is a DA packet, and wherein the second packet type is a DV packet.

In Example 12, the subject matter of any one of Examples 8-11 can optionally provide that the first data packet was generated prior to or after the second data packet.

In Example 13, the subject matter of any one of Examples 8-12 can optionally provide that the data trace log comprises retirement data associated with the instruction, wherein mapping the first and second data packets to the instruction is based at least partially on the retirement data.

In Example 14, the subject matter of any one of Examples 8-13 can optionally provide that the first data packet was generated at retirement of the instruction, and wherein the first data packet is identifiable based on the retirement data.

Any or all features of the method described above with respect to Examples 8-14 may also be implemented with respect to any device, apparatus, or system described herein.

Example 15 is a system for tracking deferred data packets in a debug trace architecture. The system comprises a memory to store a trace log generated by a data trace unit, and a processing device communicably coupled to the memory. Further to Example 15, the processing device comprises a decoding module to determine an order number corresponding to an order in which an instruction was executed relative to other executed instructions that correspond to an instruction type within a sequence of executed instructions. The decoding module is further to identify, within the data trace log, a first data packet corresponding to a first packet type and sequentially ordered, according to the order number, with respect to data packets of the first packet type within the data trace log, wherein at least one data packet within the data trace log is a post-retirement-generated data packet, identify, within the data trace log, a second data packet corresponding to a second packet type and sequentially ordered, according to the order number, with respect to data packets of the second packet type within the data trace log, and map the identified first and second data packets to the instruction, wherein at least one of the first or second data packets is generated post-retirement of the instruction.

In Example 16, the subject matter of Example 15 can optionally provide that the decoding module is further to identify the first and second data packets based on the instruction type, and wherein the first and second data packets correspond to data packets of the instruction type.

In Example 17, the subject matter of any one of Examples 15-16 can optionally provide that the instruction type is a load instruction or a store instruction.

In Example 18, the subject matter of any one of Examples 15-17 can optionally provide that the first packet type is a DA packet, and wherein the second packet type is a DV packet.

In Example 19, the subject matter of any one of Examples 15-18 can optionally provide that the first data packet was generated prior to or after the second data packet.

In Example 20, the subject matter of any one of Examples 15-19 can optionally provide that the data trace log comprises retirement data associated with the instruction, wherein mapping the first and second data packets to the instruction is based at least partially on the retirement data.

In Example 21, the subject matter of any one of Examples 15-20 can optionally provide that the first data packet was generated at retirement of the instruction, and wherein the first data packet is identifiable based on the retirement data.

Any or all features of the system described above with respect to Examples 15-21 may also be implemented with respect to any method or process described herein.

Example 22 is non-transitory computer-readable storage medium for tracking deferred data packets in a debug trace architecture. The non-transitory machine-readable medium includes data that, when accessed by a processing device, cause the processing device to perform operations comprising determining an order number corresponding to an order in which an instruction was executed relative to other executed instructions that correspond to an instruction type within a sequence of executed instructions. The operations further comprise identifying, within a data trace log, a first data packet corresponding to a first packet type and sequentially ordered, according to the order number, with respect to data packets of the first packet type within the data trace log, identifying, within the data trace log, a second data packet corresponding to a second packet type and sequentially ordered, according to the order number, with respect to data packets of the second packet type within the data trace log, and mapping the identified first and second data packets to the instruction, wherein at least one of the first or second data packets is generated post-retirement of the instruction.

In Example 23, the subject matter of Example 22 can optionally provide that the decoding module is further to identify the first and second data packets based on the instruction type, and wherein the first and second data packets correspond to data packets of the instruction type.

In Example 24, the subject matter of any one of Examples 22-23 can optionally provide that the instruction type is a load instruction or a store instruction.

In Example 25, the subject matter of any one of Examples 22-24 can optionally provide that the first packet type is a DA packet, and wherein the second packet type is a DV packet.

In Example 26, the subject matter of any one of Examples 22-25 can optionally provide that the first data packet was generated prior to or after the second data packet.

In Example 27, the subject matter of any one of Examples 22-26 can optionally provide that the data trace log comprises retirement data associated with the instruction, wherein mapping the first and second data packets to the instruction is based at least partially on the retirement data.

In Example 28, the subject matter of any one of Examples 22-27 can optionally provide that the first data packet was generated at retirement of the instruction, and wherein the first data packet is identifiable based on the retirement data.

Any or all features of the non-transitory computer-readable storage medium described above with respect to Examples 22-28 may also be implemented with respect to any device, apparatus, or system described herein. Specifics in the Examples may be used anywhere in one or more embodiments.

Example 29 is an apparatus for tracking deferred data packets in a debug trace architecture. Further to Example 29, the apparatus comprises means for determining an order number corresponding to an order in which an instruction was executed relative to other executed instructions that correspond to an instruction type within a sequence of executed instructions; means for identifying, within a data trace log, a first data packet corresponding to a first packet type and sequentially ordered, according to the order number, with respect to data packets of the first packet type within the data trace log; means for identifying, within the data trace log, a second data packet corresponding to a second packet type and sequentially ordered, according to the order number, with respect to data packets of the second packet type within the data trace log; and means for mapping the identified first and second data packets to the instruction, wherein at least one of the first or second data packets is generated post-retirement of the instruction.

In Example 30, the apparatus of Example 29 is further configured to perform the method of any one of Examples 8-14.

Example 31 is a machine-readable storage medium for tracking deferred data packets in a debug trace architecture. Further to Example 31, the machine-readable storage medium comprising a plurality of instructions that, in response to being executed by a processing device, cause the processing device to perform a method according to any one of Examples 8-14.

Example 32 is an apparatus for implementing tracking of deferred data packets in a debug trace architecture. Further to Example 32, the apparatus is configured to perform the method of any one of Examples 8-14.

Example 33 is an apparatus for implementing tracking of deferred data packets in a debug trace architecture. Further to Example 33, the apparatus comprises means for performing the method of any one of Examples 8-14.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a microcontroller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM), ROM, magnetic or optical storage media, flash memory devices, electrical storage devices, optical storage devices, acoustical storage devices, other form of storage devices for holding information received from transitory (propagated) signals (e.g., carrier waves, infrared signals, digital signals), etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
an instruction tracking unit comprising an instruction buffer to store a sequence of executed instructions; and
a data trace unit communicably coupled to the instruction tracking unit and comprising a data trace buffer and a decoding module, wherein the data trace buffer is to store a data trace log comprising data packets generated by the data trace unit responsive to the executed instructions, and wherein the decoding module is to:
determine an order number corresponding to an order in which an instruction of the executed instructions was executed relative to other of the executed instructions that correspond to an instruction type within the sequence of executed instructions;
identify, within the data trace log, a first data packet of the data packets corresponding to a first packet type and sequentially ordered, according to the order number, with respect to data packets of the first packet type within the data trace log;

identify, within the data trace log, a second data packet of the data packets corresponding to a second packet type and sequentially ordered, according to the order number, with respect to data packets of the second packet type within the data trace log; and map the identified first and second data packets to the instruction, wherein at least one of the first or second data packets comprises a deferred data packet that is generated by the data trace unit post-retirement of the instruction.

2. The processing device of claim 1, wherein the decoding module is further to identify the first and second data packets based on the instruction type, and wherein the first and second data packets correspond to data packets of the instruction type.

3. The processing device of claim 1, wherein the instruction type is a load instruction or a store instruction.

4. The processing device of claim 1, wherein the first packet type is a data address (DA) packet, and wherein the second packet type is a data value (DV) packet.

5. The processing device of claim 1, wherein the first data packet was generated prior to or after the second data packet.

6. The processing device of claim 1, wherein the data trace log comprises retirement data associated with the instruction, and wherein mapping the first and second data packets to the instruction is based at least partially on the retirement data.

7. The processing device of claim 6, wherein the first data packet was generated at retirement of the instruction, and wherein the first data packet is identifiable based on the retirement data.

8. A method comprising:
generating, by a data trace unit of a processing device, data packets responsive to executed instructions by the processing device;

determining, by the processing device, an order number corresponding to an order in which an instruction of the executed instructions was executed relative to other of the executed instructions that correspond to an instruction type within a sequence of executed instructions;

identifying, within a data trace log, a first data packet of the data packets corresponding to a first packet type and sequentially ordered, according to the order number, with respect to data packets of the first packet type within the data trace log;

identifying, within the data trace log, a second data packet of the data packets corresponding to a second packet type and sequentially ordered, according to the order number, with respect to data packets of the second packet type within the data trace log; and mapping, by the processing device, the identified first and second data packets to the instruction, wherein at least one of the first or second data packets comprises a deferred data packet that is generated post-retirement of the instruction.

9. The method of claim 8, wherein each of the first and second data packets are further identified based on the instruction type, and wherein the first and second data packets correspond to data packets of the instruction type.

10. The method of claim 8, wherein the instruction type is a load instruction or a store instruction.

11. The method of claim 8, wherein the first packet type is a DA packet, and wherein the second packet type is a DV packet.

12. The method of claim 8, wherein the first data packet was generated prior to or after the second data packet.

13. The method of claim 8, wherein the data trace log comprises retirement data associated with the instruction, wherein mapping the first and second data packets to the instruction is based at least partially on the retirement data.

14. The method of claim 13, wherein the first data packet was generated at retirement of the instruction, and wherein the first data packet is identifiable based on the retirement data.

15. A system comprising:
a memory to store a data trace log generated by a data trace unit, the data trace log comprising data packets corresponding to executed instructions;

a processing device communicably coupled to the memory, the processing device to execute the executed instructions and comprising a decoding module to:
determine an order number corresponding to an order in which an instruction of the executed instructions was executed relative to other of the executed instructions that correspond to an instruction type within a sequence of executed instructions;

identify, within the data trace log, a first data packet of the data packets corresponding to a first packet type and sequentially ordered, according to the order number, with respect to data packets of the first packet type within the data trace log, wherein at least one data packet within the data trace log comprises a deferred data packet that is generated post-retirement of the instruction;

identify, within the data trace log, a second data packet of the data packets corresponding to a second packet type and sequentially ordered, according to the order number, with respect to data packets of the second packet type within the data trace log; and map the identified first and second data packets to the instruction.

16. The system of claim 15, wherein the decoding module is further to identify the first and second data packets based on the instruction type, and wherein the first and second data packets correspond to data packets of the instruction type.

17. The system of claim 15, wherein the instruction type is a load instruction or a store instruction.

18. The system of claim 15, wherein the first packet type is a DA packet, and wherein the second packet type is a DV packet.

19. The system of claim 15, wherein the first data packet was generated prior to or after the second data packet.

20. The system of claim 15, wherein the data trace log comprises retirement data associated with the instruction, wherein mapping the first and second data packets to the instruction is based at least partially on the retirement data.

* * * * *